United States Patent [19]

Werner

[11] 4,166,350
[45] Sep. 4, 1979

[54] FRONT DEFLECTOR FOR A MOWER HAVING CUTTER-CARRYING DISCS DRIVEN FROM BENEATH

[75] Inventor: Anton Werner, Saverne, France

[73] Assignee: Kuhn, S.A., Saverne, France

[21] Appl. No.: 813,699

[22] Filed: Jul. 7, 1977

[30] Foreign Application Priority Data

Jul. 20, 1976 [FR] France .............................. 76 23086

[51] Int. Cl.² ............................................ H01D 55/18
[52] U.S. Cl. .................................... 56/320.1; 56/295; 56/13.6
[58] Field of Search .................... 56/6, 295, 13.6, 12.3, 56/192, 17.4, 320.1

[56] References Cited

U.S. PATENT DOCUMENTS 3,507,102  4/1970  Kline et al. ......................... 56/295 X

FOREIGN PATENT DOCUMENTS 1582270  4/1967  Fed. Rep. of Germany ............. 56/13.6

*Primary Examiner*—Russell R. Kinsey
*Attorney, Agent, or Firm*—Young & Thompson

[57] ABSTRACT

The disclosure is of a front deflector for a mower having cutter-carrying discs driven from beneath, the deflector having an edge to co-operate with a frustoconical element which it partly surrounds, said edge having its lower extremity above the rear outer part of the outer disc cutting zone and its upper extremity substantially above the forward part of said zone, the distance between the upper part of the outer disc and said edge increasing from the lower extremity to the upper extremity of said edge.

6 Claims, 4 Drawing Figures

FRONT DEFLECTOR FOR A MOWER HAVING CUTTER-CARRYING DISCS DRIVEN FROM BENEATH

INTRODUCTION AND BACKGROUND OF THE INVENTION

The present invention relates to a front deflector for a mower having discs driven from beneath.

Mowers of this type especially comprise a elongated housing containing the transmission elements serving to drive in rotation the discs situated above this housing, which is of minimum possible depth so that the cutting elements of the discs may cut the fodder as close as possible to the ground. Despite its shallowness this housing must have great rigidity with the purpose of ensuring good working of the said transmission elements. The manufacture of such a housing causes no problems for mowers having a working width less than 1.80 metres. However it is necessary to provide a device ensuring rigidity of the housing in disc mowers having a working width greater than 1.80 meters. meters.

For this purpose this latter type of disc mower is advantageously provided with a device comprising a beam extending above the discs and connected to the end of the elongated housing. At the end nearer at least one end of said housing, that is nearer to the outer disc this beam is connected to the said housing by means of an arm. The presence of this arm, generally fixed in the sector swept by the rear outer part of the outer disc of a mower, nevertheless constitutes a significant obstacle to good working of the mower provided with it. In fact in order to facilitate the separation of the cut fodder from the standing crop material, numerous disc mowers are provided on their outer disc, with a member such as a truncated cone, or equivalent members which also move the cut fodder rearwardly. These members perfectly fulfil their function on mowers not provided with the device intended to ensure rigidity of their housings. But, when an arm is situated close to the outer disc of a mower provided with a beam ensuring rigidity of its housing, the fodder which moves rearwardly for example thanks to a truncated cone tends to accumulate at the level of the said arm. This fodder is then minced in the subsequent passages of the cutting elements of the outer disc of the mower in the vicinity of this arm. This accumulation of fodder can even in certain cases jam the machine when the clogging effect becomes too great, and in all cases compels the user to stop the machine frequently to clear the fodder thus accumulated. Moreover, especially when the machine is cutting particularly tall and dense fodder, the outer disc, surmounted by its truncated cone, no longer succeeds in conveying the whole of the fodder towards the rear of the machine for the purpose of its deposition on the ground in the form of a windrow clearly separated from the still standing fodder. A certain quantity of cut fodder is then deposited in the zone situated between the still standing fodder and the windrow formed by the mower, whereas this zone, reserved for the passage of the tractor wheels, should normally be free of all fodder. There is thus poor separation between the mown fodder and that still standing. In the subsequent passage of the machine there is danger then of a part of the mown fodder being crushed by the tractor wheels, or being cut afresh by the mower, which then causes mincing harmful to the quality of the said fodder.

This drawback is remedied to a certain extent by increasing the height of the truncated cone fast with the outer disc. This solution is also unsatisfactory since such a rotating element, of significant height, can rapidly impart a significant unbalance. This significantly reduces the life of the bearings on which the outer disc of the mower is mounted, since these bearings are more greatly stressed than if the outer disc were equipped with a shallow truncated cone.

The object of the present invention is the provision of a front deflector adaptable to disc mowers where the elongated housing is associated with a device intended to ensure its rigidity, this deflector remedying the above-stated drawbacks. This deflector, which ensures a quite clear separation between the already cut fodder and that still standing, avoids the phenomena of clogging and mincing. This deflector likewise co-operates effectively with an element of known type, for example of shallow frustoconical form, mounted on the outer disc.

BRIEF SUMMARY OF THE INVENTION

According to the invention this front deflector comprises an edge which partially surrounds the truncated cone, this edge extending from its lower extremity, situated above a sector swept by the rear outer part of the outer disc of the mower and in the vicinity of this disc, to its upper end situated approximately above the sector swept by the forward inner part of the said outer disc, the distance between the upper part of this disc and the edge of the deflector increasing from its lower end to its upper end.

FURTHER DESCRIPTION AND ADVANTAGES OF THE INVENTION

According to one feature of the invention the distance from the upper part of the edge situated in the sector swept by the inner forward part of the outer disc of the mower to this disc is greater than the distance from the upper end of the truncated cone to this same disc.

Finally according to another characteristic of the invention the deflector is constituted by a metal plate extending approximately over the whole of the surface defined by the arm connected to the beam ensuring rigidity of the elongated housing of the mower and the edge of the said deflector. Apart from the drawbacks which the deflector according to the invention remedies, it permits of causing the fodder to slide along its edge while orienting the said fodder so that it can be moved to the rear of the mower between its two outer discs by means of the truncated cone without being able either to balance above the latter or to accumulate at the level of the arm connecting the beam to the elongated housing of the mower, thus avoiding all the harmful clogging effect. By virtue of this deflector it will be possible to work effectively under the most difficult conditions, especially in vetches, without being troubled by the drawbacks which the currently known mowers possess.

Further characteristics and advantages of the present invention will appear below in greater detail by reference to a non-limitative example of embodiment of the invention which is illustrated in the accompanying drawings, wherein:-

BRIEF DESCRIPTION OF THE VIEWS IN THE DRAWINGS

FIG. 1 shows a front view of a mower with six discs, provided with the deflector according to the invention, FIG. 2 shows an enlarged perspective view of the left portion of the device shown in FIG. 1, FIG. 3 shown a further perspective view of the deflector according to the invention, FIG. 4 shows a plan view of the structure shown in FIG. 2.

DETAILED DESCRIPTION OF THE PREFERRED EMBODIMENT

Figure 1:
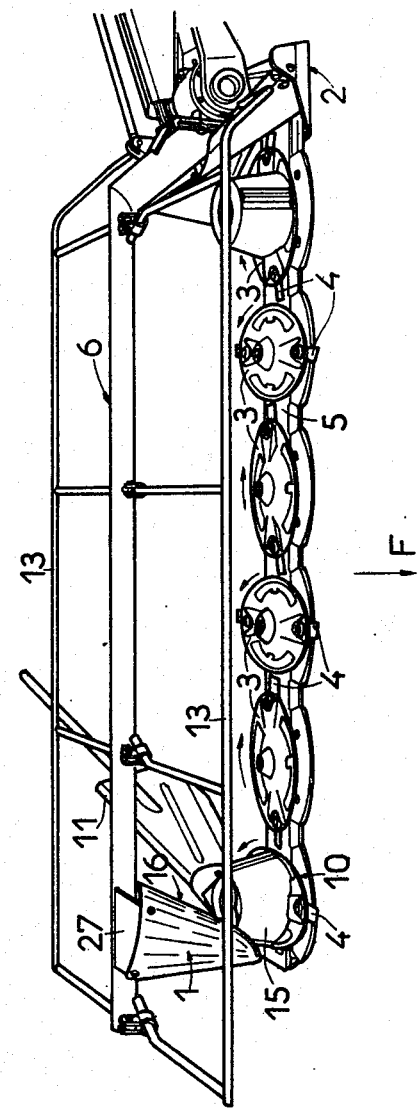

In the accompanying drawings it can be seen that the deflector 1 is mounted on a disc mower 2 comprising six discs 3 on the edges of which there are mounted articulated cutting elements 4, these elements 4 moving into cutting position under the action of centrifugal force on rotation of the discs 3 in the direction of the arrows indicated in FIG. 1. This rotation is effected by means of transmission members (not shown) located in the elongated housing 5 situated beneath the discs 3.

In order to ensure rigidity of this housing 5 a beam 6 is provided extending above the discs 3, between the two ends of the mower 2. This beam 6 is fixed at one end to the linkage device of the mower 2 and at its other end to the elongated housing 5 by means of an arm 7. Seen in the intended direction F of movement of the machine, this arm 7 extends rearwardly and downwardly from the end 8 of the beam 6 with its lower end connected at the end of the housing 5 of the mower 2 through the intermediary of a shoe 12. This connection takes place in the vicinity of the sector swept by the rear outer part 9 of the outer disc 10 of the mower 2. A windrow board 11 of known type is likewise connected in this zone to the shoe 12.

Figure 4:
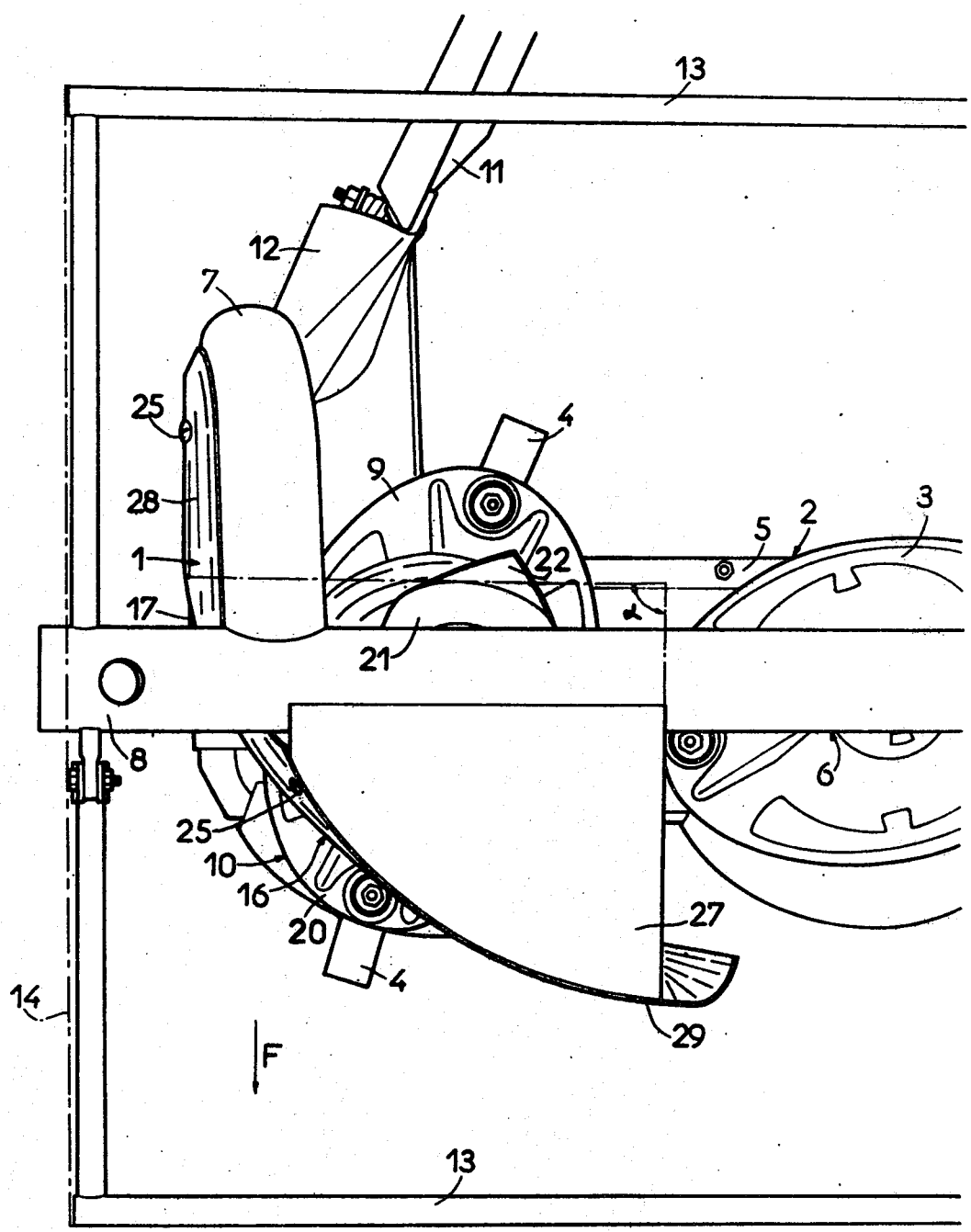

The beam 6 thus connected to the mower 2 ensures good rigidity of the elongated housing 5. In the example of embodiment according to the invention as illustrated by the Figures, the beam 6 serves as support for the frame 13 of a guard 14 (FIGS. 2 and 4) constituted by a kind of depending canvas extending towards the ground and intended to prevent the risks of projection of stones or the like caused by the rapid rotation of the discs 3 and 10.

As is known, the outer disc 10 is surmounted by a truncated cone 15 intended to convey the fodder cut by the cutting elements 4 towards the rear of the machine 2, causing it to pass between the two outer discs 10 and 3. It is therefore possible to clear a zone free of all fodder situated between the still standing fodder and the windrow formed by the windrow board 11 extending towards the rear of the mower 2. Thus the tractor wheels can run in this zone without risk of crushing the cut fodder.

In order to avoid the risks of clogging and in general the drawbacks stated above, according to the invention it is proposed to provide the mower 2 with a front deflector 1 the edge 16 of which co-operates with the truncated cone 15 which it partly surrounds. This edge 16 extends from its lower end 17, situated above the sector swept by the outer rear part 9 of the outer disc 10 of the mower 2 and in the vicinity thereof, to its upper end 18 situated substantially above the sector swept by the forward part 19, 20 of the outer disc 10. The upper end 18 of the edge 16 is preferably situated in the sector swept by the forward inner part 19 of the outer disc 10.

The edge 16 thus extends substantially to the height of the beam 6. Therefore the distance from the edge 16 situated in the sector swept by the forward inner part 19 of the outer disc 10 to this latter disc 10 is greater than the distance from the upper end 21 of the truncated cone 15 to this same disc 10. By virtue of the form of the edge 16 and the truncated cone 15 it is thus possible to guide, orient and convey the fodder cut by the outer disc 10 in such a manner that it can be discharged towards the rear between the outer discs 3 and 10. In order to avoid the fodder remaining hooked along the edge 16, the profile of the latter in its part facing the ground has a rounded section as seen especially well in FIG. 4. Thus - seen in the direction of travel of the machine - the margin of this edge 16 is inwardly curved, so as to possess no sharpness.

In order to improve the fodder conveying further, the upper end 21 of the truncated cone 15 is provided with two diametrically opposed horns 22 the respective ends of which are pointed and extend obliquely upwards and outwards. With the same purpose the truncated cone 15 comprises at least two diametrically opposed ribs 23 disposed along generatrices of the cone 15, which are offset by 90° in relation to the extremities of the horns 22. As may be seen from FIG. 3 these horns 22 and ribs 23 pass quite close to the internal face 24 of the deflector 1 and have especially the purpose of clearing fodder which may have introduced itself between this internal face 24 and the cone 15.

Figure 2:
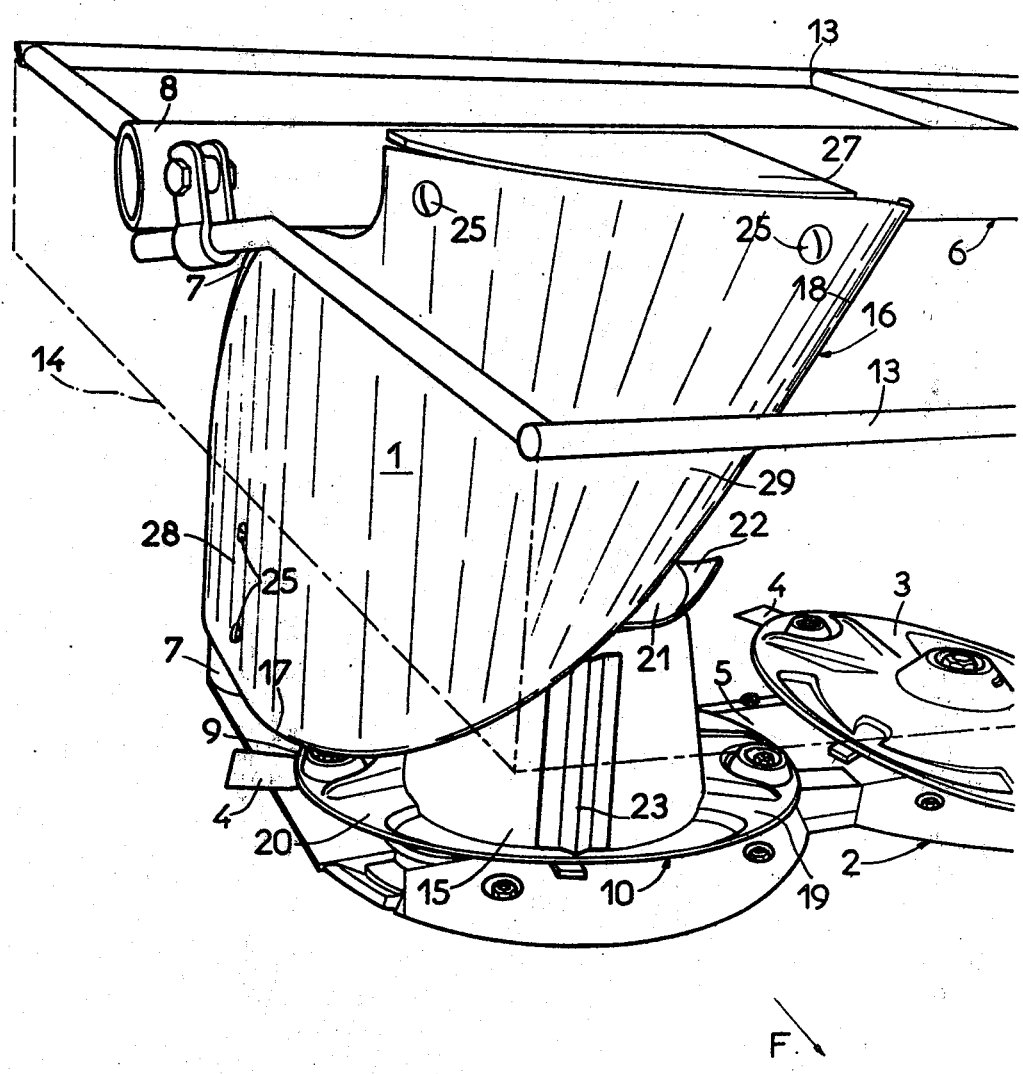
Figure 3:
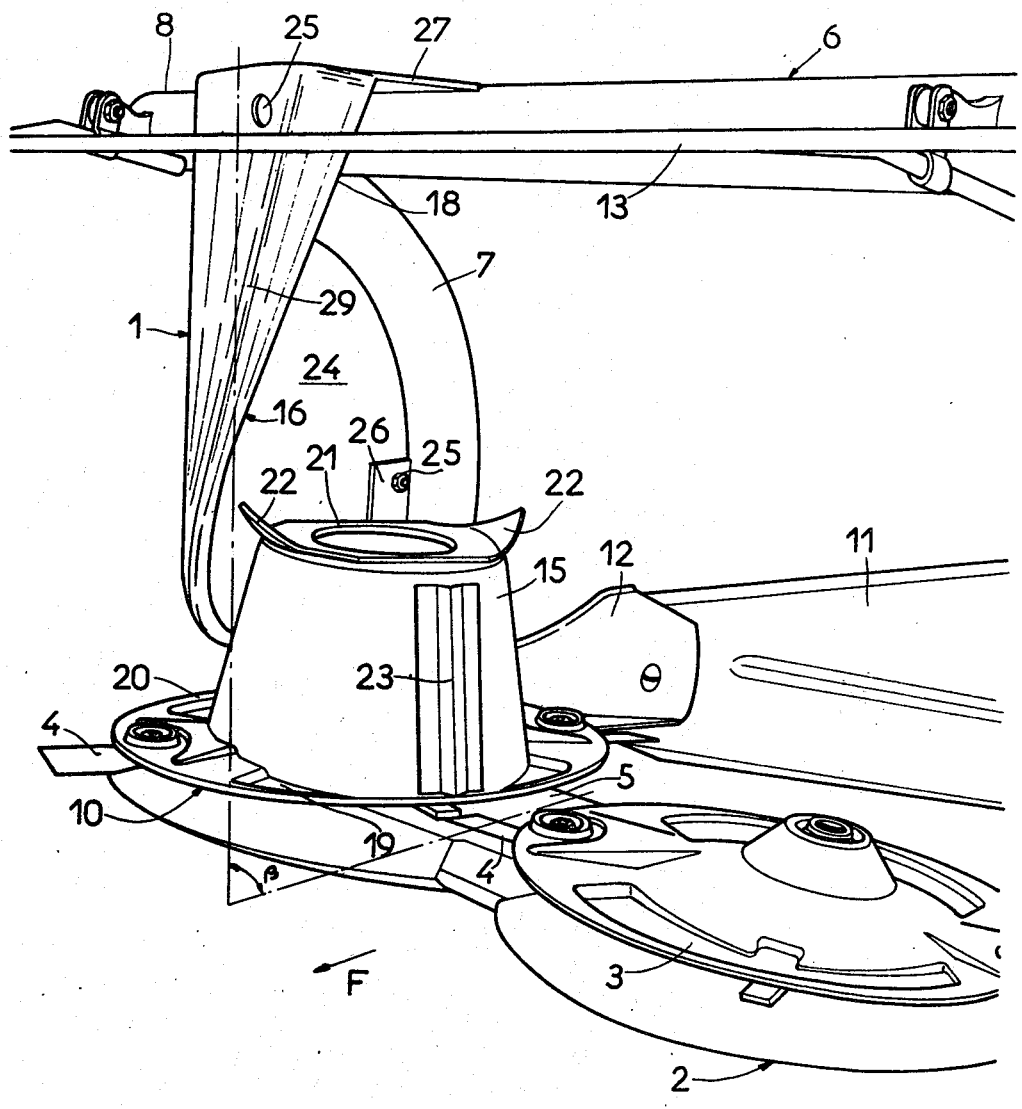

As may be seen especially clearly from FIGS. 1, 2 and 3 the front deflector 1 comprises a plate extending approximately over the whole surface defined by the arm 7 fixed to the beam 6 and the edge 16 of the said deflector 1. This permits its connection by means of screws 25 on a lug 26 (FIG. 3) welded to the arm 7. This lug 26 is welded to the arm 7 so that the deflector 1 is tangential to the said arm 7. According to the position of this lug 26 either the arm 7 is located between the deflector 1 and the discs 3, 10 of the mower 2, or the deflector 1 is located between the arm 7 and the discs 3, 10. The part of the deflector 1 fixed to the arm 7 can likewise constitute an actual streamling of the arm 7 so as to avoid all accumulation of fodder debris.

A support 27 (FIG. 4) which has an L-shaped section and is welded to the beam 6, extending approximately above the forward part 19, 20 of the outer disc 10, completes the securing of the deflector 1 to the beam 6. Since the support 27 has the form of a circular sector extending approximately horizontally above the sector swept by the forward part 19, 20 of the outer disc 10 of the mower 2, the deflector 1, fixed to this support 27, possesses approximately the form of a portion of a cylinder defined by a centre angle OC close to 90°. This cylinder portion is prolonged rearward by an approximately plane part 28 permitting to connect said deflector 1 to the lug 26 of the arm 7. Being a portion of a cylinder, the deflector 1 possesses an axis situated between the axis of rotation of the outer disc 10 and that of its adjacent disc 3 and behind these axes. The axis of the deflector 1 is moreover slightly inclined forward so that the forward zone 29 of the deflector 1, approximately parallel with the cutting front of the mower 2, and the corresponding edge portion 16 are situated in a plane which - seen in the intended direction F of movement of the machine - forms an angle α (FIG. 4) close to 90° with the plane of the elongated housing 5 of the mower 2, this angle in fact being greater than or equal to 90° with the purpose of judiciously orienting the fodder so that it may be conveyed without difficulty towards the rear of the mower by virtue of the action of the truncated cone 15.

The deflector 1 according to the invention possesses a quite particular form which it is difficult to define clearly. Consequently and with the object of clearly fixing ideas as to its form and position in relation to the elements 3, 10, 15 of the mower 2, reference will be made to the accompanying Figures representing the said deflector 1 at different angles. It will be possible in particular to appreciate the curvature of its edge 16 and its position in relation to the truncated cone 15. The deflector 1 as described above is suitable for all types of bottom-driven disc mowers. Moreover the deflector according to the invention can equally advantageously co-operate with the two truncated cone which are respectively mounted on each of the outer discs of frontal mowers.

Finally without departing from the scope of the invention it will be possible to effect various improvements, modifications or additions to the deflector as described above and in particular to modify its securing or its form provided that the results which it obtains do not vary.

What is claimed is:

1. A front deflector for a mower having discs driven from beneath by transmission elements located in an elongated housing, said housing being connected to a beam located above said discs by means of an arm extending between said beam and said housing, in the vicinity of at least one of said discs located at one end of said housing, this disc being surmounted by a truncated cone, said deflector comprising an edge which cooperates with the truncated cone which it partially surrounds, this edge extending from a lower end located above the sector swept by the rear outer part of said disc and in the vicinity of the latter to an upper end located approximately above the sector swept by the forward part of said disc, the distance between the upper part of said disc and said edge of the deflector increasing from said lower end to said upper end.

2. A front deflector according to claim 1, the distance from said upper end of the edge to said disc being greater than the distance from the upper end of the truncated cone to this same disc.

3. A front deflector for a mower having discs driven from beneath by transmission elements located in an elongated housing, said housing being connected to a beam located above said discs by means of an arm extending between said beam and said housing, in the vicinity of at least one of said discs located at one end of said housing, this disc being surmounted by a truncated cone, said deflector comprising a plate extending approximately over the whole surface defined by the arm fixed to the beam, said deflector comprising an edge cooperating with the truncated cone which it partially surrounds, this edge extending from a lower end located above the sector swept by the rear outer part of said disc and in the vicinity thereof to an upper end located approximately above the sector swept by the forward part of said disc, the distance between the upper part of this disc and said edge of the deflector increasing from said lower end to said upper end, the distance from said upper end of the edge to said disc being greater than the distance from the upper end of the truncated cone to the same disc.

4. A front deflector according to claim 3, wherein its forward zone approximately parallel with the cutting front of the mower and the corresponding portion of said edge are located in a plane which--seen in the intended direction of movement of the machine--forms an angle close to 90° with the plane of the elongated housing of the mower.

5. A front deflector for a mower having discs driven from beneath by transmission elements located in an elongated housing, said housing being connected to a beam located above said discs by means of an arm extending between said beam and said housing, in the vicinity of at least one of said discs located at one end of said housing, this disc being surmounted by a truncated cone, said deflector being constituted by a metal plate extending approximately over the whole surface defined by the arm fixed to the beam, the deflector having an edge the ground facing profile of which has an inwardly curved section, said edge cooperating with the truncated cone which it partially surrounds, this edge extending from a lower end located above the sector swept by the outer rear part of said disc and in the vicinity thereof to an upper end located approximately above the sector swept by the forward part of the said disc, the distance between the upper part of this disc and said edge of the deflector increasing from said lower end to said upper end, the distance from said upper end of the edge to said disc being greater than the distance from the upper end of the truncated cone to this same disc.

6. A front deflector according to claim 5, wherein its form is substantially that of a portion of a cylinder defined by a center angle close to 90°.

* * * * *